(12) United States Patent
Zhou

(10) Patent No.: US 9,118,692 B2
(45) Date of Patent: Aug. 25, 2015

(54) METHOD AND SYSTEM FOR ALLOCATING DELIVERY REPORTS

(75) Inventor: Shijun Zhou, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 751 days.

(21) Appl. No.: 13/501,603

(22) PCT Filed: Apr. 1, 2010

(86) PCT No.: PCT/CN2010/071511
§ 371 (c)(1),
(2), (4) Date: Apr. 12, 2012

(87) PCT Pub. No.: WO2010/145266
PCT Pub. Date: Dec. 23, 2010

(65) Prior Publication Data
US 2012/0202537 A1 Aug. 9, 2012

(30) Foreign Application Priority Data
Oct. 21, 2009 (CN) .......................... 2009 1 0236436

(51) Int. Cl.
| | |
|---|---|
| H04W 4/00 | (2009.01) |
| H04M 3/42 | (2006.01) |
| H04L 29/06 | (2006.01) |
| H04L 12/58 | (2006.01) |
| H04W 4/12 | (2009.01) |

(52) U.S. Cl.
CPC ............ *H04L 65/1043* (2013.01); *H04L 51/30* (2013.01); *H04L 51/38* (2013.01); *H04L 65/103* (2013.01); *H04L 65/1053* (2013.01); *H04W 4/12* (2013.01)

(58) Field of Classification Search
CPC ........ H04W 4/12; H04W 4/14; H04W 88/184
USPC ............................................... 455/466, 414.1
See application file for complete search history.

(56) References Cited

U.S. PATENT DOCUMENTS

2003/0105825 A1 * 6/2003 Kring et al. ................... 709/206
2003/0224809 A1 12/2003 Savinen et al.

(Continued)

FOREIGN PATENT DOCUMENTS

| CN | 1889535 A | 1/2007 |
|---|---|---|
| CN | 101094237 A | 12/2007 |
| CN | 101175046 A | 5/2008 |
| CN | 101350942 A | 1/2009 |

(Continued)

OTHER PUBLICATIONS

International Search Report for PCT/CN2010/071511 dated Jun. 11, 2010.

*Primary Examiner* — Omoniyi Obayanju
(74) *Attorney, Agent, or Firm* — Ling Wu; Stephen Yang; Ling and Yang Intellectual Property

(57) ABSTRACT

A method and a system for allocating delivery reports are disclosed in the present invention. A Service Provider (SP) sets a message identifier MSGID1 in a multimedia message and submits the multimedia message containing the MSGID1 and destination numbers to a server in a multimedia messaging service gateway (MMSG), the server sets a message identifier MSGID2 in the multimedia message, and forwards the multimedia message containing the MSGID2 and the destination number to a multimedia messaging service center (MMSC); the MMSG parses the corresponding server generating the MSGID2 according to the MSGID2 in the delivery report returned by the MMSC, and forwards the delivery report to the server creating the MSGID2. By adopting the method and system of the present invention, it ensures that the delivery reports returned by the MMSC are evenly allocated to the servers in the MMSG, the load balancing of the servers can be realized.

13 Claims, 2 Drawing Sheets

(56) References Cited

U.S. PATENT DOCUMENTS

2007/0190985 A1* 8/2007 Bai et al. .................. 455/414.1
2009/0233618 A1* 9/2009 Bai et al. .................. 455/453
2012/0202537 A1* 8/2012 Zhou ........................ 455/466

FOREIGN PATENT DOCUMENTS

| | | |
|---|---|---|
| CN | 101674548 A | 3/2010 |
| EP | 2034677 A1 | 3/2009 |
| WO | 2007080570 A1 | 7/2007 |

* cited by examiner

METHOD AND SYSTEM FOR ALLOCATING
DELIVERY REPORTS

TECHNICAL FIELD

The present invention relates to the field of multimedia messaging services, and more especially, to a method and system for allocating delivery reports involved in the implementation of information exchange between the multimedia messaging service center and the multimedia messaging service gateway.

BACKGROUND OF THE RELATED ART

Multimedia Messaging Service (MMS) is a service for transporting multimedia messages between the mobile phones as well as between the mobile phone and the Internet and is commonly referred to as the MMS. The telecom operators specify a variety of multimedia messaging service centers (MMSCs) in accordance with the region to which the user belongs, and the MMSCs provide the users with the multimedia messaging service.

The service providers (SP) have the telecommunication access resources and are the direct providers of the mobile Internet application services, they are responsible for developing and providing services such as the weather MMS which can be used by the mobile phone users according to the user requirements.

The MM7 interface is the interface between the MMSC and the Multimedia Messaging Service Gateway (MMSG) and between the MMSG and the SP, the MMSG accesses the SP through the MM7 interface and completes the functions such as caching, routing and retry of the multimedia messages; the information exchange between the MMSC and the MMSG and between the MMSG and the SP is implemented through the MM7 interface.

In the prior art, the SP evenly submits a message containing the destination number to the server in the MMSG through the switch and the router. After the server receives the message and authenticates the SP successfully, it generates a message identifier MSGID1 and forwards the message to the MMSC to which the destination number belongs, after the MMSC receives the message, it generates a message identifier MSGID2, and sends a response report containing the MSGID2 to the MMSG, the MMSG generates message control information containing the MSGID1, the MSGID2, and the destination number, saves the information to the server in the MMSG, where each destination number corresponds to a piece of message control information, and determines the module number of the saved server according to the last two numbers of the destination number; after sending down the message to the mobile phone, the MMSC sends the delivery report including MSGID2, destination number and state information, determine the module number of the server according to the last two numbers of the destination number and forwards the delivery report to the right server; the server searches for the corresponding MSGID1 via the message control information stored in the server according to the MSGID2 and the destination number in the delivery report, and then generates a response report containing the MSGID1, the destination number, and the state information and sends the response report back to the SP, the SP then judges whether the final state of the message is sent successfully or not according to the MSGID1, the destination number, as well as the state information.

In the prior art, the corresponding relationship between the destination number and the server module number is preconfigured by the system, for example: 00-49: 180, 50-99: 181 indicates that: when the last two numbers of the phone number are in the range of 00-49, it corresponds to the service 180, and when the last two numbers of the phone number are in the range of 50-99, it corresponds to the service 181. If a server 182 is added in the MMSG, in order to achieve the even allocation of the load, the server allocation rule needs to be re-specified, and the existing destination number is reconfigured, such as: 00-33: 180, 34-66: 181, and 67-99: 182. In the case that the current network traffic is increasing tremendously, there are thousands of destination numbers stored in the server, making the re-configuration of the destination numbers more and more difficult to implement.

In addition, since the MSGID2 is generated by the MMSG, the generated rules cannot be determined by the MMSG, when the MMSC returns the delivery reports back to the servers in the MMSC, the only way is according to the aforementioned server allocation rules, the module number of the server to which the messages are delivered is determined according to the last two numbers of the destination number, and in the group message, if the destination number of the message is exactly between 00-33, all the delivery reports will be totally allocated to the server 180 for processing, while the other two servers 181 and 182 are in idle state, thus the load balancing of the servers cannot be realized.

Content of the Invention

For this reason, the main purpose of the present invention is to provide a method and system for allocating delivery reports to evenly allocate delivery reports of a MMSC to each server in the MMSG, thus to achieve the load balancing of the servers and improve system scalability.

To achieve the aforementioned purpose, the technical scheme of the present invention is accomplished as:

the present invention provides a method for allocating delivery reports, comprising:

a service provider (SP) setting a message identifier MSGID1 in a multimedia message, and submitting the multimedia message containing the MSGID1 and a destination number to a server in a multimedia messaging service gateway (MMSG), and the server setting a message identifier MSGID2 in the multimedia message, and forwarding the multimedia message containing the MSGID2 and the destination number to a multimedia messaging service center (MMSC);

the MMSG parsing the corresponding server generating the MSGID2 according to the MSGID2 in the delivery report returned by the MMSC, and forwarding the delivery report to the server generating the MSGID2.

In the above solution, the method further comprises: said MSGID2 comprising a module number of the server setting the MSGID2.

In the above solution, the method further comprises: after forwarding the multimedia message to the MMSC, the server generating message control information and saving the message control information in the server, the MMSC sending the received multimedia message to a mobile phone, and returning the delivery report back to the MMSG.

In the above solution, the method further comprises: the message submitted to the server in the MMSG comprising the MSGID1, message subject, message content, the destination number and message priority;

the message forwarded by the server to the MMSC comprises: the MSGID2 and the destination number.

In the above solution, the message control information comprises: corresponding relationship among the MSGID1, the MSGID2, the destination number and SP address;

the delivery report returned by the MMSC to the MMSG comprises: the MSGID2 and the destination number.

In the above solution, the method further comprises: after said delivery report is forwarded to the corresponding server generating the MSGID2, the server receiving the delivery report searching out the corresponding MSGID1 according to the message control information saved in the server, generating a delivery report containing the MSGID1 and state information and returning the delivery report back to the SP.

The present invention also provides a system for allocating delivery reports, comprising a SP, a server in a MMSG, and a MMSC, and the system further comprises: a message generating and submitting module contained in the SP, a message generating and forwarding module, a control information storing module and a delivery report transceiving and parsing module contained in the server; wherein, the message generating and submitting module is configured to set a message identifier MSGID1 in a multimedia message, and submit the multimedia message containing the MSGID1 to the server;

the message generating and forwarding module is configured to set a message identifier MSGID2 in the multimedia message, and forward the multimedia message containing the MSGID2 to the MMSC;

the control information storing module is configured to store message control information;

the delivery report transceiving and parsing module is configured to receive the delivery report returned by the MMSC, and in accordance with the MSGID2 in the delivery report, parse a module number of the server generating the MSGID2, and forward the delivery report to the server generating the MSGID2.

In the above solution, the MSGID2 set by the message generating and forwarding module contains the module number of the server generating the MSGID2.

In the above solution, the multimedia message submitted to the server comprises: the MSGID1, a message subject, message content, a destination number, and message priority;

the multimedia message forwarded to the MMSC comprises: the MSGID2 and the destination number;

the message control information comprises corresponding relationship among the MSGID1, the MSGID2, the destination number, and SP address;

the delivery report comprises: the MSGID2, the destination number, and state information.

In the above solution, the delivery report transceiving and parsing module is further configured to receive delivery reports forwarded from other servers.

In the above solution, the system further comprises: a response report generating module and a final state determining module; wherein, the response report generating module is configured to search out the corresponding MSGID1 in the control information storing module according to the MSGID2 and the destination number in the delivery report, generate a response report containing the MSGID1 and the state information and return the response report back to the SP;

the final state determining module is configured to determine a final state of the message according to the MSGID1 and the state information in the response report.

PREFERRED EMBODIMENTS OF THE PRESENT INVENTION

The basic idea of the present invention is: the SP sets a message identifier MSGID1 in a multimedia message, submits the multimedia message containing the MSGID1 and the destination number to the server in the MMSG, the server sets the message identifier MSGID2 in the multimedia message, and forwards the message containing the MSGID2 and the destination number to the MMSC to which the destination number belongs; the MMSG parses the corresponding server generating the MSGID2 according to the MSGID2 in the delivery report returned by the MMSC and forwards the delivery report to the server generating the MSGID2.

In the existing networking, the MMSG comprises a switch, a router, and one or more servers, the process of the SP submitting a message to the MMSG is specifically: the SP evenly allocating the submitted message to each server in the MMSG via the switch and the router.

Figure 1:
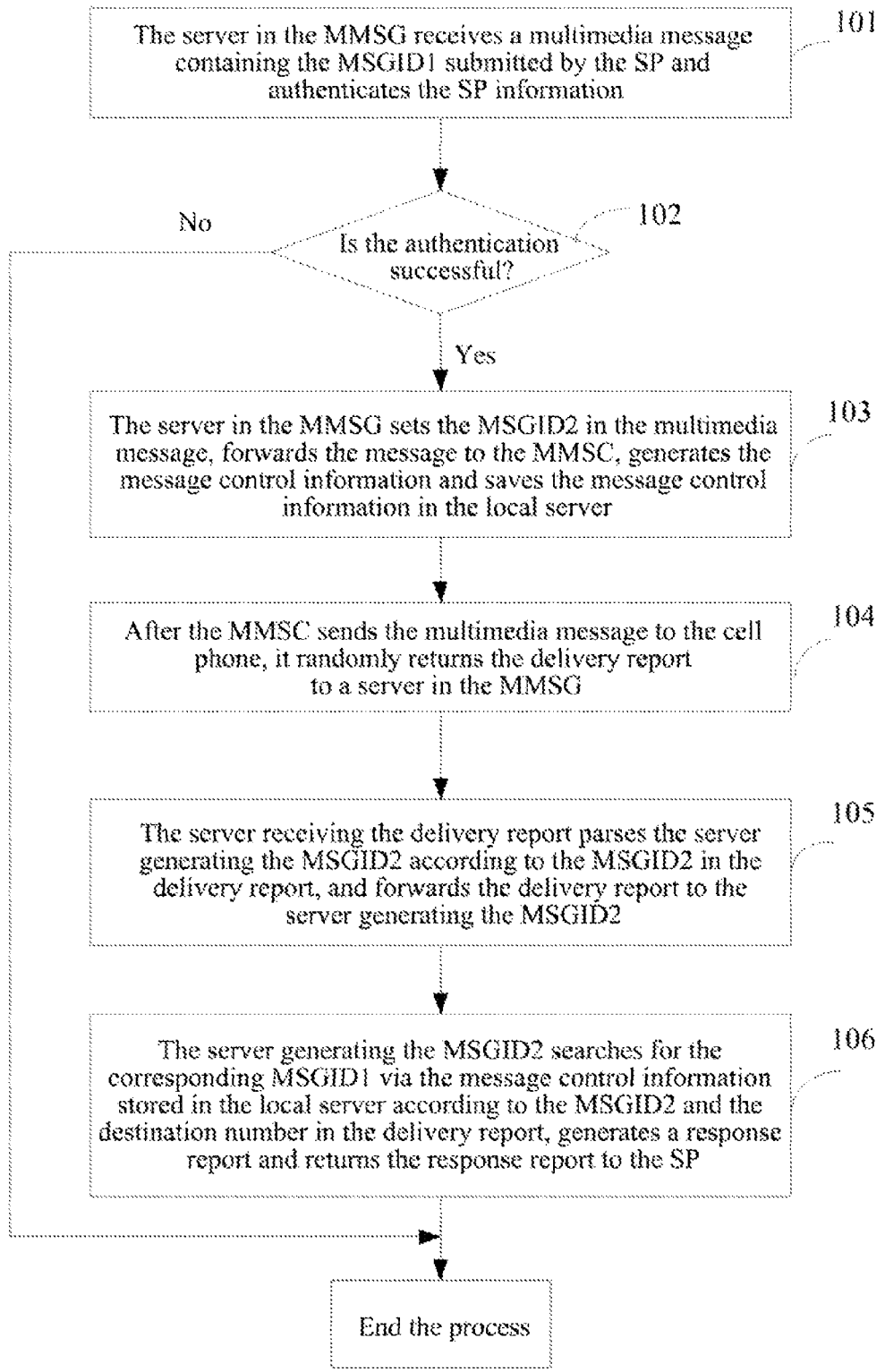
FIG. 1 is a flow chart of a method for allocating delivery reports in the present invention.

The method for allocating delivery reports provided in the present invention is as shown in FIG. 1, and the method comprises the following steps:

steps 101~102: the server in the MMSG receives a multimedia message containing the MSGID1 submitted by the SP and authenticate the SP information; if the authentication is successful, proceed to step 103; if the authentication is unsuccessful, the current process ends.

In this step, first of all, the SP sets a message identifier MSGID1 in the multimedia message, so that the SP generates the message identifier MSGID1 to uniquely identify the multimedia message in the SP; secondly, the SP randomly and evenly submit the message to the server in the MMSG via the switch and the router, the message submitted to the server comprises: the MSGID1, the message subject, the message content, the destination number, the message priority, and so on, where the module number of the server is 180; if it is a group message, there are multiple destination numbers, and all of the destination numbers are contained in one message;

after the server 180 in the MMSG receives the message, it authenticates the SP information, if the MMSG does not configure the SP as the message sending and receiving sides, or the MMSG does not configure the IP of the SP, or the authentication of the SP by the MMSG fails, the MMSG returns a failure response to the SP, and the current process ends; if the authentication is successful, the MMSG returns a successful response to the SP, and the response comprises the MSGID 1 and the destination phone number, proceed to step 103.

Step 103: the servers in the MMSG set the MSGID2 in the multimedia message, forward the message to the MMSC, and generate the message control information and save the message control information in the local server;

in this step, after the server 180 in the MMSG receives the multimedia message, a message identifier MSGID2 is set to make the server 180 generate the message identifier MSGID2 for the message and to uniquely identify the message in the MMSG, and the module number 180 of the server generating the MSGID2 is contained in the MSGID2; after the server 180 parses, charges and authenticates the destination number in the message, the message is classified according to the MMSC to which the destination number belongs and forwarded the message to the MMSC to which the destination number belongs, and the message forwarded to the MMSC comprises: the MSGID2 and the destination number;

if it is a group of messages, each message is respectively forwarded to the MMSC to which the destination numbers belong; after the server 180 successfully forwards the message to the MMSC, it generates the message control information and save the information in the server 180, a destination number corresponds to a piece of message control information, and the message control information comprises: the corresponding relationship among the MSGID1, the MSGID2, the destination number and the SP address.

Step 104: after the MMSC sends the multimedia message to the cell phone, it randomly returns the delivery report to a server in the MMSG;

in this step, after the MMSC receives the multimedia message forwarded by the server 180 in the MMSG, it sends the multimedia message to the mobile phone, generates a delivery report, and randomly delivers the delivery report to a server in the MMSG via the switch and the router, suppose the message is delivered to the server whose module number is 181; the delivery report comprises: the MSGID2, the destination number, and the state information, when the cell phone successfully receives the message, the state information is successful, otherwise, the state information is unsuccessful;

when multiple messages are sent to the cell phones with different destination numbers, the MMSC generates multiple delivery reports, uses the feature of load balancing of the switch and the router to randomly and evenly deliver the multiple delivery reports to each server in the MMSG via the switch and the router.

Step 105: the servers receiving the delivery reports parse the server generating the MSGID2 according to the MSGID2 in the delivery report, and forward the delivery report to the server generating the MSGID2;

in this step, after the server 181 in the MMSG receives the delivery report returned by the MMSC, it parses out that the module number of the server generating the MSGID2 is 180 according to the MSGID2 in the delivery report, the server 181 forwards the delivery report to the server 180; if in step 104, the delivery report is just delivered to the server 180 and does not need to be forwarded.

Step 106: the server generating the MSGID2 searches for the corresponding MSGID1 via the message control information stored in the local server according to the MSGID2 and the destination number in the delivery report, and generates a response report and returns the response report to the SP.

In this step, after the server 180 receives the delivery report forwarded by the server 181, the server 180 searches out the message control information in this server according to the MSGID2 and the destination number in the delivery report, and searches out the MSGID2 and the MSGID1 corresponding to the destination number according to the message control information, and generates a response report containing the MSGID1 and the state information and returns the response report back to the SP; the SP determines the final state of the message according to the MSGID1, the destination number and the state information;

if the phone successfully receives the message, the state information is successful, and the final state is also successful; otherwise, the state information is failed, so as the final state.

Figure 2:
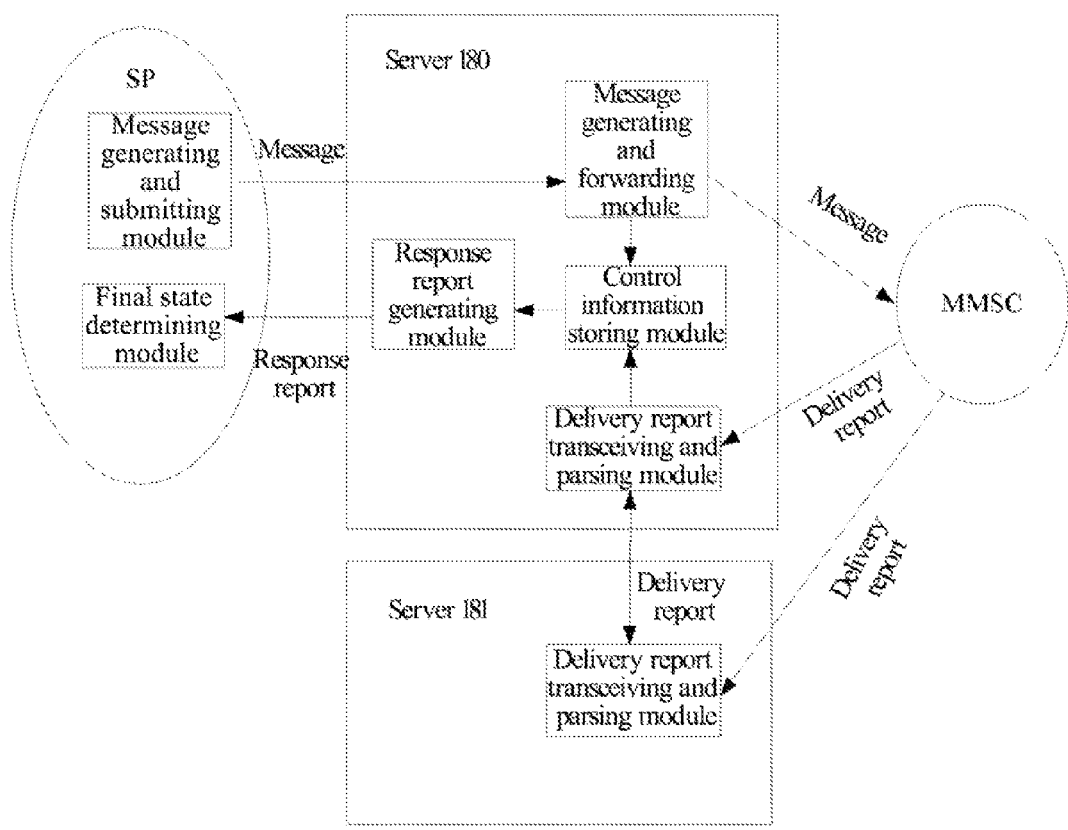
FIG. 2 is a schematic diagram of a system for allocating delivery reports in the present invention.

Based on the aforementioned method, the present invention also provides a system for allocating delivery reports, as shown in FIG. 2, the system comprises: the SP, the server and the MMSC, and the system comprises: a message generating and submitting module contained in the SP, a message generating and forwarding module, a control information storing module and a delivery report transceiving and parsing module contained in the server.

In this system, each server in the MMSG contains the message generating and forwarding module, the control information storing module, and the delivery report transceiving and parsing module, that is, the compositions of the server 180 and the server 181 in FIG. 2 are identical, for the sake of simplification, only the delivery report transceiving and parsing module is shown in the server 181. Wherein, the message generating and submitting module is used to set a message identifier MSGID1 in a multimedia message, and submit the multimedia message containing the MSGID1 to the server; the multimedia message submitted to the server comprises: the MSGID1, the message subject, the message content, the destination number, and the message priority;

the message generating and forwarding module is used to set a message identifier MSGID2 in the multimedia message, and forward the multimedia message containing the MSGID2 to the MMSC; wherein, the MSGID2 records the module number of the server generating the MSGID2; the multimedia message forwarded to the MMSC comprises: the MSGID2 and the destination number;

the control information storage module is used to store the message control information, and the message control information comprises the corresponding relationship among the MSGID1, the MSGID2, the destination number, and the SP address;

the delivery report transceiving and parsing module is used to receive the delivery report returned by the MMSC, and in accordance with the MSGID2 in the delivery report, parse the module number of the server generating the MSGID2, and forward the delivery report to the server generating the MSGID2; the delivery report comprises: the MSGID2, the destination number, and the state information;

the delivery report transceiving and parsing module is also used to receive the delivery reports forwarded by other servers.

The system also comprises: the response report generating module contained in the server and the final state determining module contained in the SP; wherein, the response report generation module is used to search for the corresponding MSGID1 in the control information storage module according to the MSGID2 and the destination number in the delivery report, and generate a response report containing the MSGID1 and the state information and return them back to the SP;

the final state determining module is used to determine the final state of the message according to the MSGID1 and the state information in the response report.

The above description is only the preferred embodiments of the present invention and it is not intended to limit the protection scope of the present invention, without departing from the spirit and principle of the present invention, any modification, equivalent replacement and improvement should be included in the protection scope of the present invention.

What is claimed is:

1. A method for allocating delivery reports, comprising:
    a service provider (SP) setting a message identifier MSGID1 in a multimedia message, and submitting the multimedia message containing the MSGID1 and a destination number to a server in a multimedia messaging service gateway (MMSG), and the server setting a message identifier MSGID2 in the multimedia message, and forwarding the multimedia message containing the MSGID2 and the destination number to a multimedia messaging service center (MMSC), and the server generating message control information and saving the message control information in the server;

the MMSG parsing the corresponding server generating the MSGID2 according to the MSGID2 in the delivery report returned by the MMSC, and forwarding the delivery report to the server generating the MSGID2; and the server generating the MSGID2 searching out the corresponding MSGID1 according to the message control information saved in the server, generating a delivery report containing the MSGID1 and state information and returning the delivery report back to the SP.

2. The method of claim 1, wherein, said MSGID2 comprises a module number of the server setting the MSGID2.

3. The method of claim 1, the method further comprising: after forwarding the multimedia message to the MMSC, the MMSC sending the received multimedia message to a mobile phone, and returning the delivery report back to the MMSG.

4. The method of claim 1, wherein, the message submitted to the server in the MMSG comprises: the MSGID1, message subject, message content, the destination number and message priority;

the message forwarded by the server to the MMSC comprises: the MSGID2 and the destination number.

5. The method of claim 1, wherein, the message control information comprises: corresponding relationship among the MSGID1, the MSGID2, the destination number and SP address;

the delivery report returned by the MMSC to the MMSG comprises: the MSGID2 and the destination number.

6. A system for allocating delivery reports, comprising a service provider (SP), a server in a multimedia messaging service gateway (MMSG), and a multimedia messaging service center (MMSC), and the system further comprising: a message generating and submitting module contained in the SP, a message generating and forwarding module, a control information storing module and a delivery report transceiving and parsing module contained in the server; wherein, the message generating and submitting module is configured to set a message identifier MSGID1 in a multimedia message, and submit the multimedia message containing the MSGID1 to the server;

the message generating and forwarding module is configured to set a message identifier MSGID2 in the multimedia message, and forward the multimedia message containing the MSGID2 to the MMSC;

the control information storing module is configured to store message control information;

the delivery report transceiving and parsing module is configured to receive the delivery report returned by the MMSC, and in accordance with the MSGID2 in the delivery report, parse a module number of the server generating the MSGID2, and forward the delivery report to the server generating the MSGID2;

wherein the system further comprises a response report generating module in the server;

the response report generating module is configured to search out the corresponding MSGID1 in the control information storing module according to the MSGID2 and the destination number in the delivery report, generate a response report containing the MSGID1 and state information and return the response report back to the SP.

7. The system of claim 6, wherein, the MSGID2 set by the message generating and forwarding module contains the module number of the server generating the MSGID2.

8. The system of claim 6, wherein, the multimedia message submitted to the server comprises: the MSGID1, a message subject, message content, a destination number, and message priority;

the multimedia message forwarded to the MMSC comprises: the MSGID2 and the destination number;

the message control information comprises corresponding relationship among the MSGID1, the MSGID2, the destination number, and SP address;

the delivery report comprises: the MSGID2, the destination number, and state information.

9. The system of claim 8, wherein, the delivery report transceiving and parsing module is further configured to receive delivery reports forwarded from other servers.

10. The system of claim 9, the system further comprising: a final state determining module in the SP; wherein, the final state determining module is configured to determine a final state of the message according to the MSGID1 and the state information in the response report.

11. The system of claim 7, wherein, the multimedia message submitted to the server comprises: the MSGID1, a message subject, message content, a destination number, and message priority;

the multimedia message forwarded to the MMSC comprises: the MSGID2 and the destination number;

the message control information comprises corresponding relationship among the MSGID1, the MSGID2, the destination number, and SP address;

the delivery report comprises: the MSGID2, the destination number, and state information.

12. The system of claim 11, wherein, the delivery report transceiving and parsing module is further configured to receive delivery reports forwarded from other servers.

13. The system of claim 12, the system further comprising: a final state determining module in the SP; wherein, the final state determining module is configured to determine a final state of the message according to the MSGID1 and the state information in the response report.

\* \* \* \* \*